US012638044B1

(12) United States Patent
Zhou

(10) Patent No.: US 12,638,044 B1
(45) Date of Patent: May 26, 2026

(54) POSITIONING DEVICE

(71) Applicant: Shenzhen Manwei Internet Co., Ltd, Shenzhen (CN)

(72) Inventor: Yiyao Zhou, Shenzhen (CN)

(73) Assignee: Shenzhen Manwei Internet Co., Ltd, Shenzhen (CN)

( * ) Notice: Subject to any disclaimer, the term of this patent is extended or adjusted under 35 U.S.C. 154(b) by 0 days.

(21) Appl. No.: 19/419,195

(22) Filed: Dec. 15, 2025

(30) Foreign Application Priority Data

Nov. 3, 2025 (CN) ......................... 202522327143.X

(51) Int. Cl.
*F16C 11/10* (2006.01)
*G06F 1/16* (2006.01)

(52) U.S. Cl.
CPC ............ *F16C 11/10* (2013.01); *G06F 1/1667* (2013.01)

(58) Field of Classification Search
CPC ......... E05D 11/1064; E05D 2011/1035; E05D 11/105; E05D 11/10; E05D 11/1007
USPC ......................................... 16/332, 344, 367
See application file for complete search history.

(56) References Cited

U.S. PATENT DOCUMENTS

| | | | | | |
|---|---|---|---|---|---|
| 2,240,790 A | * | 5/1941 | Kuney | ................... | E05D 11/105 16/334 |
| 4,401,344 A | * | 8/1983 | Chihara | ............... | B60N 2/2352 297/367 R |

| | | | | | |
|---|---|---|---|---|---|
| 4,437,703 A | * | 3/1984 | Nishikori | ............. | B60N 2/2352 16/344 |
| 5,460,599 A | * | 10/1995 | Davis | .................... | A61F 5/0125 602/26 |
| 6,581,243 B2 | * | 6/2003 | Parizel | ................ | E05D 11/1071 16/334 |
| 6,993,808 B1 | * | 2/2006 | Bennett | ................. | A61F 5/0125 16/334 |
| 7,013,532 B2 | * | 3/2006 | Lu | .......................... | G06F 1/1622 16/337 |
| 7,617,569 B2 | * | 11/2009 | Liao | ......................... | E06C 1/32 16/334 |
| 8,898,862 B1 | * | 12/2014 | McGrath | ............. | E05D 11/1007 16/334 |
| 9,315,205 B2 | * | 4/2016 | Chuah | ..................... | B62B 7/062 |
| 2011/0297196 A1 | * | 12/2011 | Durante | ............. | E05D 11/1007 135/15.1 |
| 2013/0340205 A1 | * | 12/2013 | Chuah | ...................... | B62B 7/06 16/327 |
| 2016/0066659 A1 | * | 3/2016 | Wu | ........................ | G04G 17/00 16/327 |

* cited by examiner

*Primary Examiner* — Jeffrey O'Brien

(57) ABSTRACT

A positioning device includes a support member, a turntable, a sliding block, and an elastic locking device. The turntable is rotatably mounted on the support member. The sliding block is movably mounted on the support member and movable between a first position and a second position. The elastic locking device is mounted on the sliding block. When the sliding block is at the first position, the elastic locking device engages with the turntable. When the sliding block is at the second position, the elastic locking device is separated from the turntable. The elastic locking device includes a locking block and a spring. The device allows for switching the elastic locking device between a separated state and an engaged state relative to the turntable by moving the sliding block, facilitating convenient use and simple construction.

10 Claims, 4 Drawing Sheets

POSITIONING DEVICE

CROSS-REFERENCE TO RELATED APPLICATIONS

This application claims priority under 35 U.S.C. § 119 to Chinese Patent Application No. 202522327143X, filed on Nov. 3, 2025, the entire contents of which are incorporated herein by reference.

TECHNICAL FIELD

The present disclosure relates to the field of keyboard positioning structures, and specifically relates to a positioning device.

BACKGROUND OF THE INVENTION

Existing keyboard devices often feature a turntable rotatably mounted thereon to connect with a tablet protective case. This allows the tablet protective case, together with the turntable, to undergo multi-angle rotational adjustment relative to the keyboard, thereby achieving flexible adjustment of the tablet's support angle.

In existing keyboard devices, an elastic locking device is typically used to position the turntable, preventing the turntable from swaying arbitrarily after rotating to a desired position. However, in these existing devices, the elastic locking device is permanently in a state of engagement with the turntable. A user cannot switch the elastic locking device to a state where it is separated from the turntable and then back to a state of engagement according to their needs, which fails to meet diverse usage requirements.

To address the above problems, some companies have recently developed new positioning devices. Although these devices can switch the elastic locking device between a separated state and an engaged state relative to the turntable, the structures are relatively complex, manufacturing costs are high, and the switching operation is cumbersome, falling far short of the high requirements of the industry.

SUMMARY OF THE INVENTION

To overcome the deficiencies of the prior art, an objective of the present disclosure is to provide a positioning device that allows an elastic locking device to be switched between a state of separation from a turntable and a state of engagement with the turntable by moving a sliding block to a second position or a first position. The switching operation is simple and quick, and the structure is simple, thereby reducing manufacturing costs.

The objective of the present disclosure is achieved by the following technical solution: A positioning device comprising a support member, a turntable, a sliding block, and an [0008] elastic locking device. The turntable is rotatably mounted on the support member. The sliding block is movably mounted on the support member and is movable between a first position and a second position. The elastic locking device is mounted on the sliding block. When the sliding block is located at the first position, the elastic locking device engages with the turntable. When the sliding block is located at the second position, the elastic locking device is separated from the turntable.

The elastic locking device comprises a locking block and a spring. The locking block is movably mounted on the sliding block. A plurality of turntable positioning structures are arranged circumferentially on the turntable. An abutment portion configured for the locking block to abut against is formed between any two adjacent turntable positioning structures on the turntable. The locking block is configured to interlockingly engage with the turntable positioning structures and to emit a sound when interlockingly engaging with the turntable positioning structures. The spring is disposed between the locking block and the sliding block. When the sliding block is located at the first position, the spring provides an elastic force that pushes the locking block toward the turntable.

Preferably, an installation cavity is provided on the sliding block, and the locking block is movably mounted within the installation cavity of the sliding block. The spring is disposed between the locking block and a wall of the installation cavity.

Preferably, an end of the locking block proximal to the turntable is provided with a lock block mating structure configured to interlockingly engage with the turntable positioning structures.

Preferably, one of the turntable positioning structure and the lock block mating structure is an interlocking recess, and the other is an interlocking protruding tooth configured to interlockingly engage with the interlocking recess.

Preferably, the turntable positioning structure is an interlocking recess, and the lock block mating structure is an interlocking protruding tooth configured to interlockingly engage with the interlocking recess.

Preferably, the abutment portion is a spacing protrusion that protrudes relative to the interlocking recess.

Preferably, a pressing plate is provided on the sliding block, and the pressing plate is configured to press against the turntable.

Preferably, an elastic positioning member is provided on the sliding block, and a first positioning engagement structure and a second positioning engagement structure are provided on the support member. When the elastic positioning member snap-fits with the first positioning engagement structure, the sliding block is maintained at the first position. When the elastic positioning member snap-fits with the second positioning engagement structure, the sliding block is maintained at the second position.

Preferably, the elastic positioning member comprises a first elastic sheet and a second elastic sheet. The first elastic sheet is disposed on one side of the sliding block, and the second elastic sheet is disposed on another side of the sliding block. The first elastic sheet is provided with a first protrusion, and the second elastic sheet is provided with a second protrusion. The first positioning engagement structure comprises a first positioning slot and a second positioning slot, wherein the first positioning slot is configured to receive the first protrusion, and the second positioning slot is configured to receive the second protrusion. The second positioning engagement structure comprises a third positioning slot and a fourth positioning slot, wherein the third positioning slot is configured to receive the first protrusion, and the fourth positioning slot is configured to receive the second protrusion.

Preferably, a moving cavity is provided on the support member, and the sliding block is movably mounted within the moving cavity. The first positioning slot and the second positioning slot are respectively disposed in one-to-one correspondence on two opposing inner sidewalls of the moving cavity. The third positioning slot and the fourth positioning slot are respectively disposed in one-to-one correspondence on the two opposing inner sidewalls of the moving cavity.

Compared with the prior art, the beneficial effects of the present disclosure include:

The positioning device provided by the present disclosure utilizes a combination of a support member, a turntable, a sliding block, and an elastic locking device. By mounting the elastic locking device on the sliding block and configuring the sliding block to be movable between a first position and a second position, the elastic locking device can be switched between a state of separation from the turntable or a state of engagement with the turntable simply by moving the sliding block to the second position or the first position. This makes the switching operation simple, quick, and convenient to use. Furthermore, the structure is simple and easy to assemble, which reduces manufacturing costs.

BRIEF DESCRIPTION OF DRAWINGS

At least one specification heading is required. Please delete this heading section if it is not applicable to your application. For more information regarding the headings of the specification, please see MPEP 608.01(a).

To illustrate the technical solutions of the embodiments more clearly, the accompanying drawings used in the description of the embodiments are briefly introduced below. In the following description, identical reference numerals denote identical components. It is understood that the drawings described below are only some embodiments of the present application, and other drawings may be obtained by those of ordinary skill in the art without inventive effort.

Figure 1:
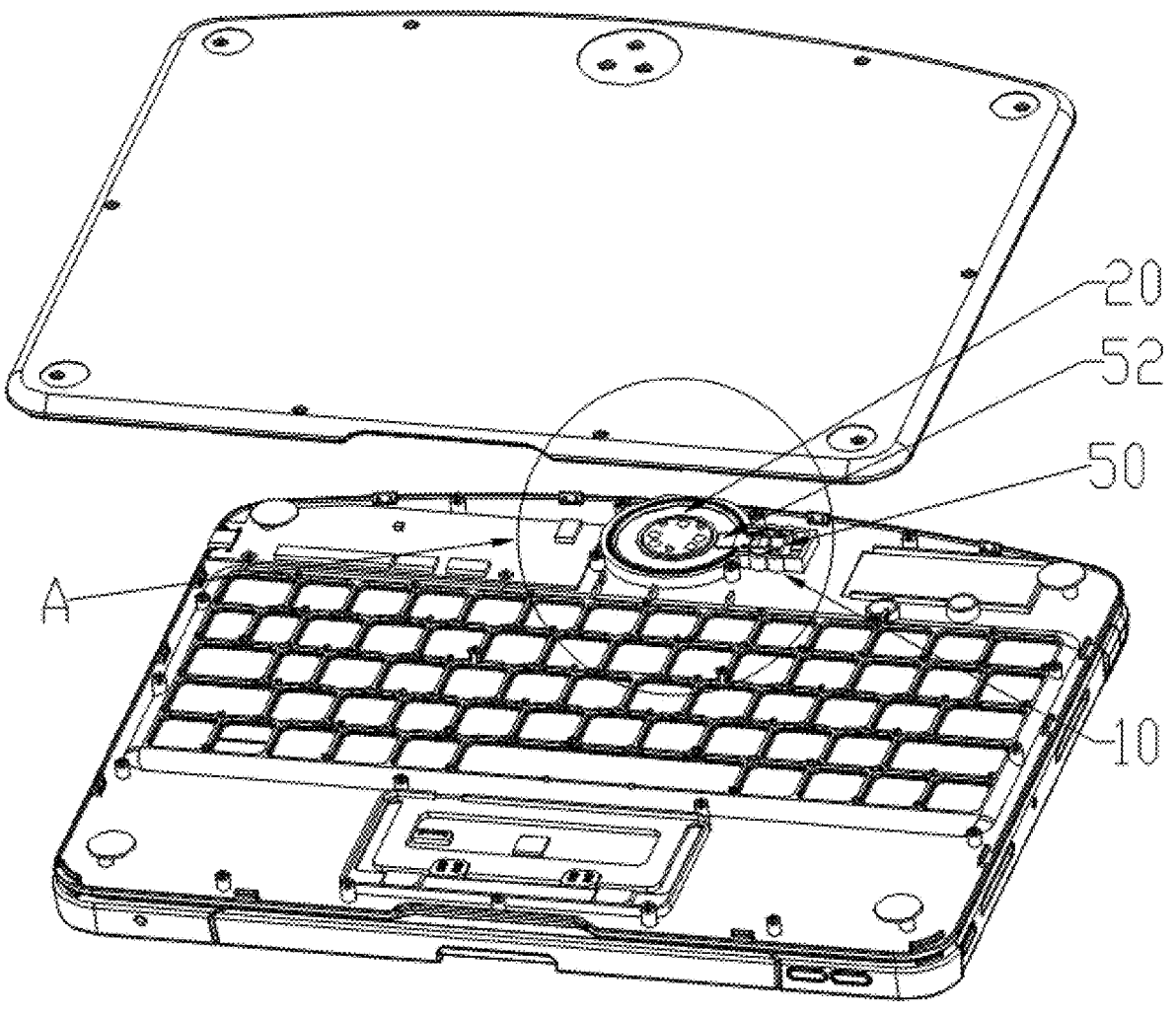
FIG. 1 is a schematic structural view of a positioning device according to an embodiment of the present disclosure.

Reference Numerals: Support Member (10); Moving Cavity (11); Turntable (20); Turntable Positioning Structure (21); Abutment Portion (22); Locking Block (30); Lock Block Mating Structure (31); Elastic Element Slot (32); Installation Cavity (33); Sliding Block (50); Elastic Positioning Member (51); First Protrusion (53); Second Protrusion (54); First Elastic Sheet (55); Second Elastic Sheet (56); Pressing Plate (62); Elastic Locking Device (70); First Positioning Engagement Structure (80); First Positioning Slot (81); Second Positioning Slot (82); Second Positioning Engagement Structure (90); Third Positioning Slot (91); Fourth Positioning Slot (92).

DETAILED DESCRIPTION OF THE INVENTION

As used herein, the terms "comprises," "comprising," "includes," "including," "has," "having," or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Furthermore, the use of the indefinite articles "a" or "at least one" to describe elements and components herein is employed merely for convenience and to give a general sense of the scope of the invention. This description should be read to include "one" or "at least one," and unless it is obvious that it is meant otherwise, the singular also includes the plural.

Certain exemplary embodiments of the present invention are described herein and are illustrated in the accompanying figures. The described embodiments are provided only for purposes of illustrating the present invention and should not be interpreted as limiting the scope of the invention. Other embodiments, modifications, combinations, and improvements of the embodiments described herein will occur to those skilled in the art, and all such alternate embodiments, combinations, modifications, and improvements are within the scope of the present invention.

While the making and use of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

To facilitate understanding of the embodiments described herein, a number of terms are defined below. The terms defined herein have the meanings as commonly understood by those of ordinary skill in the art relevant to the present invention. Terms such as "a," "at least one," and "the" are not intended to refer only to a singular entity, but rather include the general class of which a specific example may be used for illustration. The terminology is used to describe specific embodiments of the invention, but their usage does not limit the invention, except as set forth in the claims.

The phrase "in one embodiment," as used herein, does not necessarily refer to the same embodiment, though it may do so. Conditional language used herein, such as "can," "might," "may," "for example," and the like, unless specifically stated otherwise or as otherwise understood within the context as used, is generally intended to convey that certain embodiments include, while other embodiments do not include, certain features, elements, and/or states. Thus, such conditional language is not generally intended to imply that features, elements, and/or states are required for one or more embodiments, or that one or more embodiments must include logic for deciding whether such features, elements, and/or states are included or are to be performed in any particular embodiment, regardless of whether such logic is operable, implemented, or otherwise.

The technical solutions of the exemplary embodiments of the present application are described clearly and completely below in conjunction with the figures of the present application. It is apparent that the described embodiments are only a part of the embodiments of the present application and not all possible embodiments. All other embodiments obtained by those skilled in the art based on the disclosed embodiments without creative efforts shall fall within the scope of the protection of the present application.

Figure 2:
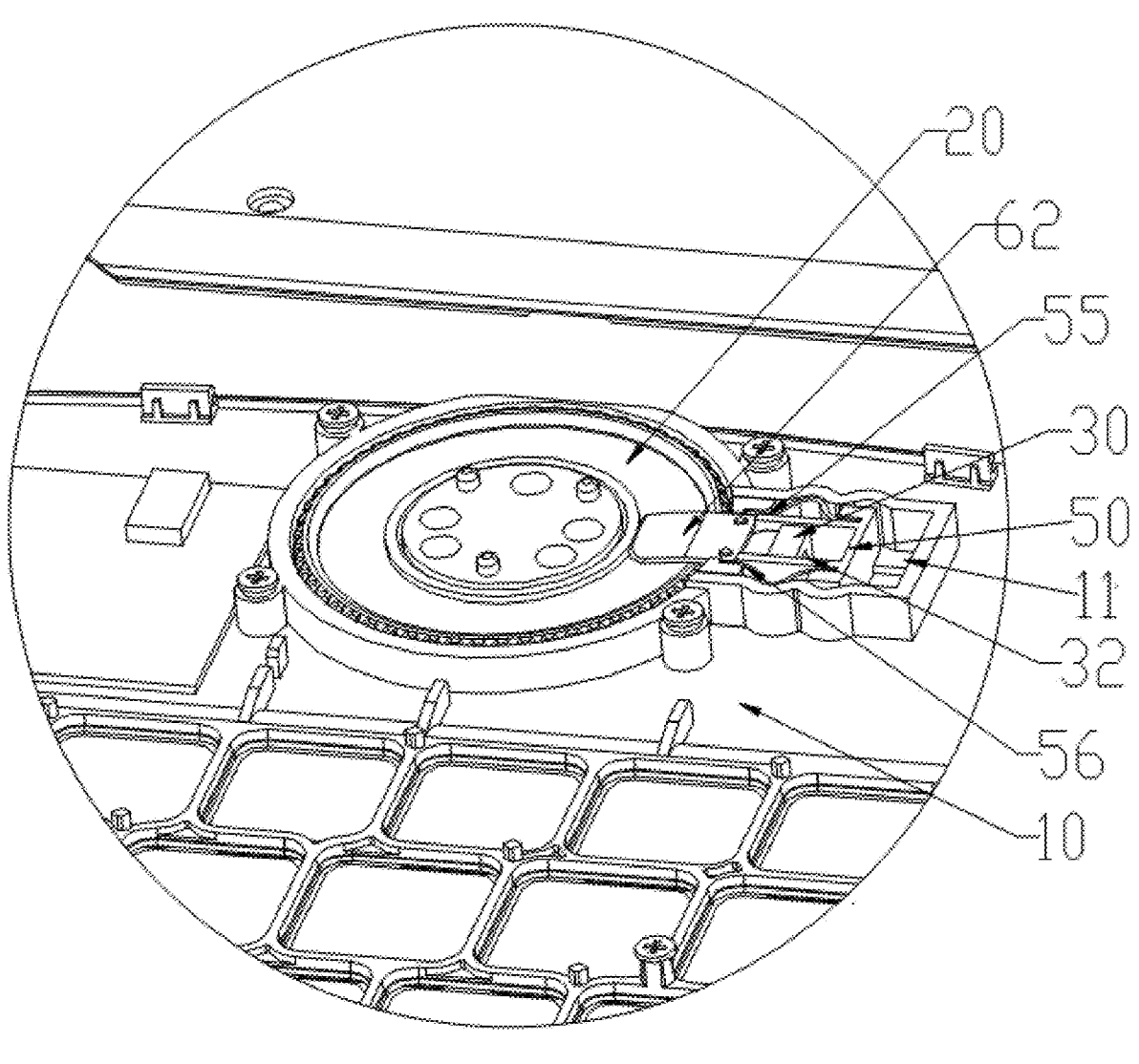
FIG. 2 is an enlarged view of area A in FIG. 1.
Figure 3:
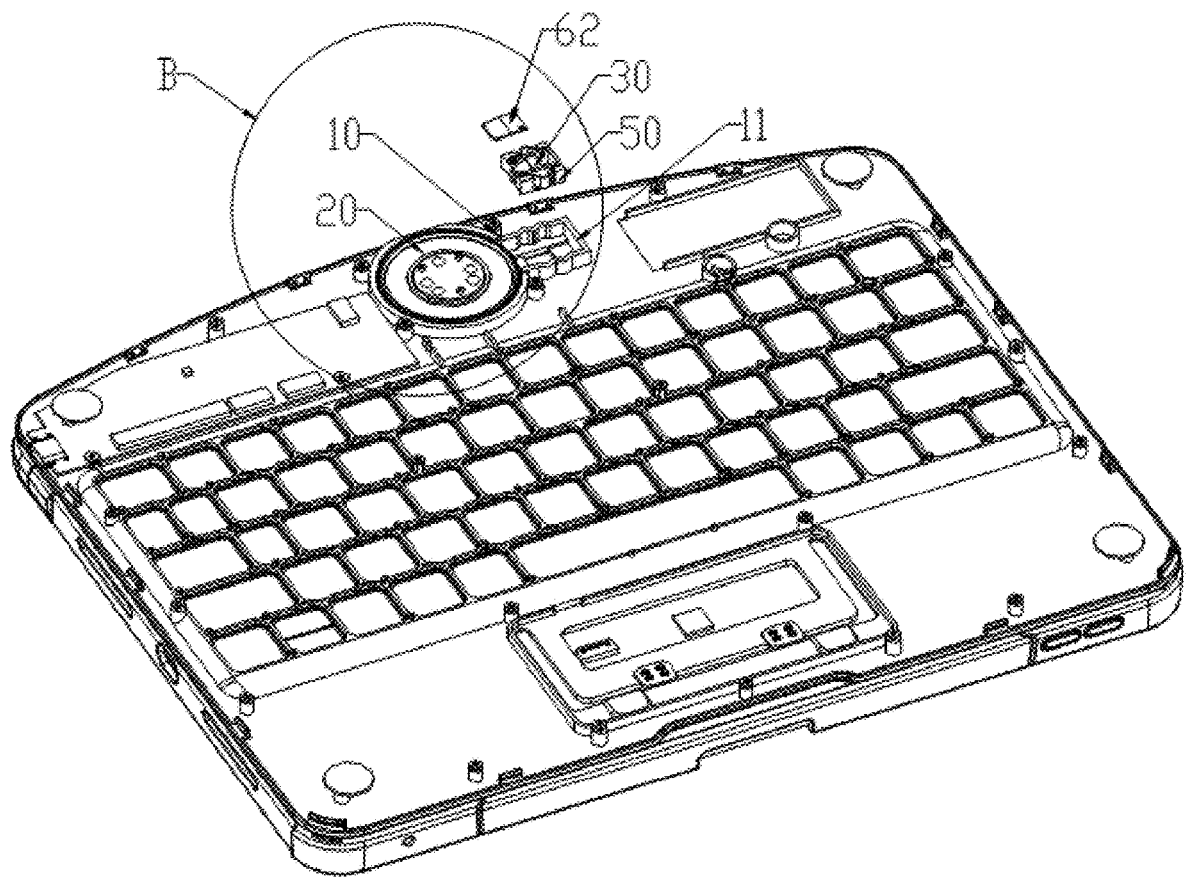
FIG. 3 is an exploded view of the positioning device according to an embodiment of the present disclosure.
Figure 4:
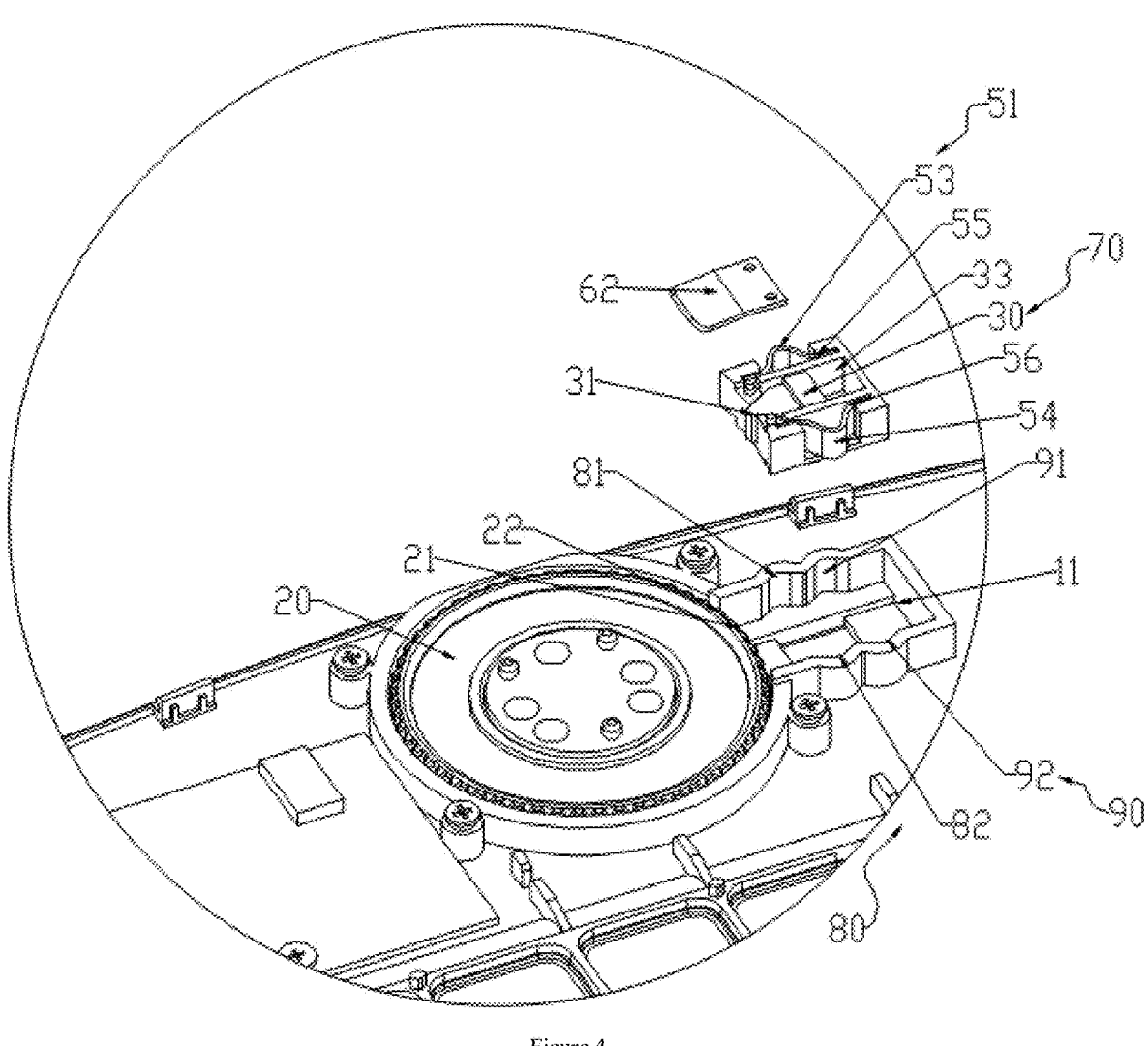
FIG. 4 is an enlarged view of area B in FIG. 3.

As shown in FIGS. 1-4, a positioning device comprises a Support Member (10), a Turntable (20), a Sliding Block (50), and an Elastic Locking Device (70). The Turntable (20) is rotatably mounted on the Support Member (10). The Sliding Block (50) is movably mounted on the Support Member (10) and is movable between a first position and a second position. The Elastic Locking Device (70) is mounted on the Sliding Block (50).

When the Sliding Block (50) is located at the first position, the Elastic Locking Device (70) engages with the Turntable (20). When the Sliding Block (50) is located at the second position, the Elastic Locking Device (70) is separated from the Turntable (20). The Elastic Locking Device (70) includes a Locking Block (30) and a spring. The Locking Block (30) is movably mounted on the Sliding Block (50). The Turntable (20) has a plurality of Turntable Positioning Structures (21) arranged circumferentially thereon. An Abutment Portion (22), configured for the Locking Block (30) to abut against, is formed on the Turntable (20) between any two adjacent Turntable Positioning Structures (21).

The Locking Block (30) is configured to interlockingly engage with the Turntable Positioning Structures (21) and to emit a sound when interlockingly engaging with the Turntable Positioning Structures (21). The spring is disposed between the Locking Block (30) and the Sliding Block (50). When the Sliding Block (50) is in the first position, the spring is configured to provide an elastic force that pushes the Locking Block (30) toward the Turntable (20).

In use, when a user pushes the Sliding Block (50) to the first position, the Elastic Locking Device (70) is in a state of engagement with the Turntable (20). When the Turntable (20) rotates under a pushing force from the user, the Locking Block (30) abuts toward the Turntable (20) under the elastic force of the spring. As the Turntable (20) rotates, the Locking Block (30) sequentially interlockingly engages with the corresponding Turntable Positioning Structures (21) and collides to emit a sound, allowing the user to clearly perceive the positioning operation. Once the Turntable (20) has rotated to the desired position, the Locking Block (30) interlockingly engages with the corresponding Turntable Positioning Structure (21). Through the interlocking engagement between a Lock Block Mating Structure (31) and the corresponding Turntable Positioning Structure (21), a positioning effect is exerted on the Turntable (20), preventing the Turntable (20) from swaying arbitrarily.

Conversely, by moving the Sliding Block (50) to the second position, the Locking Block (30) is brought into a state of separation from the Turntable (20). This removes the locking effect of the Locking Block (30) on the Turntable (20). Consequently, when rotating the Turntable (20), the sound caused by the collision of the Locking Block (30) with the Turntable (20) is avoided. Thus, the positioning device provided by the present disclosure, through the combination of the Support Member (10), the Turntable (20), the Sliding Block (50), and the Elastic Locking Device (70), and by mounting the Elastic Locking Device (70) on the Sliding Block (50) which is movable between the first and second positions, allows the Elastic Locking Device (70) to be switched between a state of separation from or engagement with the Turntable (20) simply by moving the Sliding Block (50) to the second position or the first position. This makes the switching operation simple, convenient, and user-friendly. Moreover, the structure is simple and easy to assemble, which reduces manufacturing costs.

The Sliding Block (50) is provided with an Installation Cavity (33), and the Locking Block (30) is movably mounted within the Installation Cavity (33) of the Sliding Block (50). The spring is disposed between the Locking Block (30) and a wall of the Installation Cavity (33). Adoption of this structure facilitates the installation of the Sliding Block (50). Specifically, the Locking Block (30) is provided with an Elastic Element Slot (32), and one end of the spring is installed within the Elastic Element Slot (32) to improve the stability of the spring installation.

The end of the Locking Block (30) proximal to the Turntable (20) is provided with a Lock Block Mating Structure (31) configured for interlocking engagement with the Turntable Positioning Structures (21). One of the Turntable Positioning Structure (21) and the Lock Block Mating Structure (31) is an interlocking recess, and the other is an interlocking protruding tooth configured to interlockingly engage with the interlocking recess. That is, if the Turntable Positioning Structure (21) is configured as an interlocking recess, then the Lock Block Mating Structure (31) is configured as an interlocking protruding tooth that engages with the interlocking recess; if the Turntable Positioning Structure (21) is configured as an interlocking protruding tooth, then the Lock Block Mating Structure (31) is configured as an interlocking recess.

In the present embodiment, the Turntable Positioning Structure (21) is an interlocking recess, and the Lock Block Mating Structure (31) is an interlocking protruding tooth configured to interlockingly engage with the interlocking recess. The Abutment Portion (22) is a spacing protrusion that protrudes relative to the interlocking recess. During the rotation of the Turntable (20) under the user's pushing force, the interlocking protruding tooth crosses over the corresponding spacing protrusion as the Turntable (20) rotates and enters into the interlocking recess under the elastic force of the spring. A sound is emitted when the interlocking protruding tooth enters from the spacing protrusion into the respective interlocking recess. When the Turntable (20) rotates to the proper position, the interlocking protruding tooth is embedded within the corresponding interlocking recess.

The Sliding Block (50) is provided with a Pressing Plate (62). The Pressing Plate (62) is configured to press against the Turntable (20). The Pressing Plate (62) presses against the Turntable (20) to exert a positioning effect on the Turntable (20) via the Pressing Plate (62). The Sliding Block (50) is provided with a mounting post, and the Pressing Plate (62) is sleeved on the mounting post to facilitate the installation of the Pressing Plate (62).

The Sliding Block (50) is provided with an Elastic Positioning Member (51), and the Support Member (10) is provided with a First Positioning Engagement Structure (80) and a Second Positioning Engagement Structure (90). When the Elastic Positioning Member (51) snap-fits with the First Positioning Engagement Structure (80), the Sliding Block (50) is maintained at the first position. When the Elastic Positioning Member (51) snap-fits with the Second Positioning Engagement Structure (90), the Sliding Block (50) is maintained at the second position. Through the snap-fit cooperation of the Elastic Positioning Member (51) with the First Positioning Engagement Structure (80) and the Second Positioning Engagement Structure (90), it is ensured that the Sliding Block (50) can be stably locked in the first position or the second position, avoiding accidental displacement of the Sliding Block (50) caused by shaking or accidental touch, thereby improving the reliability and stability of the separated and engaged states of the Elastic Locking Device (70) and the Turntable (20).

The Elastic Positioning Member (51) includes a First Elastic Sheet (55) and a Second Elastic Sheet (56). The First Elastic Sheet (55) is disposed on one side of the Sliding Block (50), and the Second Elastic Sheet (56) is disposed on the other side of the Sliding Block (50). The First Elastic Sheet (55) is provided with a First Protrusion (53), and the Second Elastic Sheet (56) is provided with a Second Protrusion (54). The First Positioning Engagement Structure (80) includes a First Positioning Slot (81) and a Second Positioning Slot (82). The First Positioning Slot (81) is configured to receive the First Protrusion (53), and the Second Positioning Slot (82) is configured to receive the Second Protrusion (54). The Second Positioning Engagement Structure (90) includes a Third Positioning Slot (91) and a Fourth Positioning Slot (92). The Third Positioning Slot (91) is configured to receive the First Protrusion (53), and the Fourth Positioning Slot (92) is configured to receive the Second Protrusion (54). By adopting the above structure for the Elastic Positioning Member (51), the First Positioning Engagement Structure (80), and the Second Positioning Engagement Structure (90), snap-fit cooperation is facilitated, as well as processing and installation.

Specifically, both ends of the First Elastic Sheet (55) are fixed to one side of the Sliding Block (50), and the First Protrusion (53) protrudes outwardly relative to the Sliding Block (50). Both ends of the Second Elastic Sheet (56) are fixed to the other side of the Sliding Block (50), and the Second Protrusion (54) protrudes outwardly relative to the Sliding Block (50). One side of the Sliding Block (50) is provided with two first fixing grooves, and the two ends of the First Elastic Sheet (55) are respectively fixed in the first fixing grooves in one-to-one correspondence. The other side of the Sliding Block (50) is provided with two second fixing grooves, and the two ends of the Second Elastic Sheet (56) are respectively fixed in the second fixing grooves in one-to-one correspondence.

The Support Member (10) is provided with a Moving Cavity (11), and the Sliding Block (50) is movably mounted within the Moving Cavity (11). The First Positioning Slot (81) and the Second Positioning Slot (82) are respectively disposed in one-to-one correspondence on two opposing inner sidewalls of the Moving Cavity (11). The Third Positioning Slot (91) and the Fourth Positioning Slot (92) are respectively disposed in one-to-one correspondence on the two opposing inner sidewalls of the Moving Cavity (11). By adopting this structure, the Moving Cavity (11) provides a guiding space for the movement of the Sliding Block (50), preventing the Sliding Block (50) from deviating during movement. Simultaneously, arranging the positioning slots on the sidewalls allows the Elastic Positioning Member (51) to conveniently snap-fit with the First Positioning Engagement Structure (80) or the Second Positioning Engagement Structure (90) as the Sliding Block (50) moves to the corresponding position.

In the foregoing embodiments, descriptions of each embodiment are emphasized differently, and parts not detailed in one embodiment can be referred to in the descriptions of other embodiments.

It should be noted that all directional indications (such as upper, lower, left, right, front, rear, etc.) described in the embodiments of this invention serve only to illustrate the relative positional relationships and movement between respective components in a given posture. If the specific posture changes, then such directional indications should be changed accordingly.

It is further to be noted that when an element is referred to as being "fixed to" or "disposed on" another element, it may be directly on that other element or may also be present with intermediate elements therebetween. When an element is referred to as being "connected" to another element, it may be directly connected or indirectly connected via one or more intermediate elements.

Moreover, any reference to "first," "second," and the like in this invention is solely for the purpose of distinction and description, and should not be construed as indicating or implying any relative importance or a specific quantity of the indicated technical features. Thus, a feature designated as "first" or "second" may expressly or implicitly refer to at least one such feature. In addition, the technical solutions in various embodiments can be combined with one another, but such combination must be based on feasibility as understood by those of ordinary skill in the art. If such combinations result in contradictions or are not technologically feasible, such combinations are considered not to exist and do not fall within the protection scope of the present invention.

The above description relates only to the preferred embodiments of the present invention and should not be construed as limiting the scope of the claimed invention. Any equivalent structural modification or transformation utilizing the invention's teachings and drawings, whether applied directly or indirectly to other related technical fields, shall be deemed to fall within the scope of protection of the present invention.

The invention claimed is:

1. A positioning device, comprising:
a support member;
a turntable;
a sliding block; and
an elastic locking device;
wherein the turntable is rotatably mounted on the support member;
wherein the sliding block is movably mounted on the support member and is movable between a first position and a second position;
wherein the elastic locking device is mounted on the sliding block;
wherein when the sliding block is located at the first position, the elastic locking device engages with the turntable;
wherein when the sliding block is located at the second position, the elastic locking device is separated from the turntable;
wherein the elastic locking device comprises a locking block and a spring;
wherein the locking block is movably mounted on the sliding block, and a plurality of turntable positioning structures are arranged circumferentially on the turntable;
wherein an abutment portion configured for the locking block to abut against is formed on the turntable between any two adjacent turntable positioning structures;
wherein the locking block is configured to interlockingly engage with the turntable positioning structures and to emit a sound when interlockingly engaging with the turntable positioning structures, and the spring is disposed between the locking block and the sliding block; and
wherein when the sliding block is located at the first position, the spring provides an elastic force that pushes the locking block toward the turntable.

2. The positioning device according to claim 1, wherein an installation cavity is provided on the sliding block, and the locking block is movably mounted within the installation cavity of the sliding block; and wherein the spring is disposed between the locking block and a wall of the installation cavity.

3. The positioning device according to claim 2, wherein an end of the locking block proximal to the turntable is provided with a lock block mating structure configured to interlockingly engage with the turntable positioning structures.

4. The positioning device according to claim 3, wherein one of the turntable positioning structure and the lock block mating structure is an interlocking recess, and the other is an interlocking protruding tooth configured to interlockingly engage with the interlocking recess.

5. The positioning device according to claim 4, wherein the turntable positioning structure is an interlocking recess, and the lock block mating structure is an interlocking protruding tooth configured to interlockingly engage with the interlocking recess.

6. The positioning device according to claim 5, wherein the abutment portion is a spacing protrusion that protrudes relative to the interlocking recess.

7. The positioning device according to claim 1, wherein a pressing plate is provided on the sliding block, and the pressing plate is configured to press against the turntable.

8. The positioning device according to claim 1, wherein an elastic positioning member is provided on the sliding block, and a first positioning engagement structure and a second positioning engagement structure are provided on the support member;

wherein when the elastic positioning member snap-fits with the first positioning engagement structure, the sliding block is maintained at the first position; and wherein when the elastic positioning member snap-fits with the second positioning engagement structure, the sliding block is maintained at the second position.

9. The positioning device according to claim 8, wherein the elastic positioning member comprises a first elastic sheet and a second elastic sheet, the first elastic sheet being disposed on one side of the sliding block, and the second elastic sheet being disposed on another side of the sliding block;

wherein the first elastic sheet is provided with a first protrusion, and the second elastic sheet is provided with a second protrusion;

wherein the first positioning engagement structure comprises a first positioning slot and a second positioning slot, the first positioning slot being configured to receive the first protrusion, and the second positioning slot being configured to receive the second protrusion; and wherein the second positioning engagement structure comprises a third positioning slot and a fourth positioning slot, the third positioning slot being configured to receive the first protrusion, and the fourth positioning slot being configured to receive the second protrusion.

10. The positioning device according to claim 9, wherein a moving cavity is provided on the support member, and the sliding block is movably mounted within the moving cavity;

wherein the first positioning slot and the second positioning slot are respectively disposed in one-to-one correspondence on two opposing inner sidewalls of the moving cavity; and wherein the third positioning slot and the fourth positioning slot are respectively disposed in one-to-one correspondence on the two opposing inner sidewalls of the moving cavity.

\* \* \* \* \*